US008848901B2

(12) United States Patent
Diethorn

(10) Patent No.: US 8,848,901 B2
(45) Date of Patent: Sep. 30, 2014

(54) SPEECH CANCELER-ENHANCER SYSTEM FOR USE IN CALL-CENTER APPLICATIONS

(75) Inventor: Eric John Diethorn, Long Valley, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 1811 days.

(21) Appl. No.: 11/401,368

(22) Filed: Apr. 11, 2006

(65) Prior Publication Data

US 2007/0237336 A1 Oct. 11, 2007

(51) Int. Cl.

*H04M 1/00* (2006.01)
*H04M 9/00* (2006.01)
*H04R 3/00* (2006.01)
*H04R 1/10* (2006.01)
*H04R 5/033* (2006.01)

(52) U.S. Cl.

CPC .............. *H04R 1/1083* (2013.01); *H04R 3/005* (2013.01); *H04R 5/033* (2013.01); *H04R 2410/05* (2013.01)
USPC .............. 379/392.01

(58) Field of Classification Search

USPC .............. 379/406.01–406.16, 392.01
See application file for complete search history.

(56) References Cited

U.S. PATENT DOCUMENTS

| | | | | |
|---|---|---|---|---|
| 6,418,214 | B1 * | 7/2002 | Smythe et al. | 379/202.01 |
| 6,745,014 | B1 * | 6/2004 | Seibert et al. | 455/74.1 |
| 2002/0141601 | A1 * | 10/2002 | Finn et al. | 381/92 |
| 2003/0055535 | A1 * | 3/2003 | Voeller et al. | 700/279 |
| 2004/0196984 | A1 * | 10/2004 | Dame et al. | 381/71.1 |
| 2005/0060142 | A1 * | 3/2005 | Visser et al. | 704/201 |
| 2005/0207567 | A1 * | 9/2005 | Parry et al. | 379/406.01 |
| 2006/0034448 | A1 * | 2/2006 | Parry | 379/406.01 |
| 2008/0201138 | A1 * | 8/2008 | Visser et al. | 704/227 |

* cited by examiner

*Primary Examiner* — Sonia Gay

(74) *Attorney, Agent, or Firm* — Muncy, Geissler, Olds & Lowe, P.C.

(57) ABSTRACT

A call-center has agents using headsets, which are connected to a private business exchange (PBX). Noise cancellation occurs in a noise filter, within or connected to the PBX. Noise cancellation for a particular agent's conversation is achieved by receiving the voice signals from neighboring agents' headsets and by using adaptive noise cancellation in the noise filter to remove the other agents' conversations from the particular agent's conversation. Microphones may also be placed at other noise sources, such as HVAC equipment, so that offending noises are accurately received at the noise filter and removed from the agents' conversations.

14 Claims, 3 Drawing Sheets

SPEECH CANCELER-ENHANCER SYSTEM FOR USE IN CALL-CENTER APPLICATIONS

BACKGROUND OF THE INVENTION

1. Field of the Invention

The present invention concerns the reduction of background noise picked up by a first microphone spoken into by a first person. More particularly, the present invention concerns reducing background noise in telephone conversations, where an agent is working in a noisy environment.

2. Description of the Related Art

Call centers, where many agents are calling many persons simultaneously, are widely employed throughout several industries. For example, several stockbrokers in close proximity to each other call many stockholders simultaneously. Telemarketers and pollsters often sit in side-by-side cubicles and call households. Often dozens of emergency personnel sit side-by-side in a 911-call center and receive urgent requests for emergency services.

A common problem in such call centers is that background noise can be distracting and cause miscommunications. The background noise is primarily due to the voices of the other agents in the call center who are simultaneously communicating on other unrelated telephone calls. Moreover, sensitive information can sometimes be heard in the background conversations, such as in the case of the stockbrokers or 911-call center instances.

Another source of background noise problems in such situations can be mechanical sounds emanating from nearby equipment, such as printers, photocopiers, automatic doors, elevators, and HVAC systems. Such sounds may also interfere with a conversation and lead to miscommunications, distractions and annoyances.

As an example with reference to FIG. 1, let agent A be a call-center agent of interest who is engaged in a telephone call with customer A. The call transpires between the agent A and the customer A via a headset on agent A, a wired connection to a private business exchange (PBX) 20, a wired connection to a public switched telephone network (PSTN) 22 and a wired connection to a headset, handset or speakerphone of the customer A.

Speech from other agents B . . . N, near agent A, may arrive at agent A's microphone and be transmitted to customer A. This extraneous speech is not related to the conversation occurring between agent A and customer A and degrades the quality of the conversation occurring between agent A and customer A. Likewise, if a sheet-feeding photocopier 2 or rattling heating vent 4 is close to agent A, those extraneous sounds may also enter into agent A's microphone and be an annoyance to the conversation, as perceived by customer A.

One attempt to address these problems in the background art has been the employment of noise-canceling headsets in a call center. A noise-canceling headset 10 employed by an agent A in a call center, according to the background art, is illustrated in FIG. 2. The headset 10 includes a primary microphone 12 directed toward the mouth of agent A, wearing the headset 10. A secondary microphone 14 is directed away from the mouth of agent A. The secondary microphone 14 is intended to pickup the extraneous noises EN in the environment surrounding the headset 10, such as the conversations of other nearby agents B, C . . . N and equipment noises in the environment. The primary microphone 12 is intended to pickup the voice of agent A.

The outputs of the primary and secondary microphones 12 and 14 are connected to a digital signal processor (DSP) 16 in the headset 10. The DSP 16 analyzes the extraneous noise EN signals received from secondary microphone 14 and attempts to modify the voice signal received from the primary microphone 12 by removing the extraneous noise EN sound signals. This modification is accomplished by adaptive signal processing. Adaptive signal processing systems and methods to remove unwanted noise from a sound signal are known in the art and would be understood by those of ordinary skill in the art. See for example, Widrow and S. D. Stearns, *Adaptive Signal Processing,* Prentice-Hall, 1985.

The modified voice signal 15 is output by the DSP 16 and sent to the private business exchange (PBX) 20 via a wired connection 18. The modified voice signal 15 may also be sent to speakers 19 of the headset 10 for the benefit of agent A, wearing the headset 10. The PBX 20 sends the modified voice signal to the public switched telephone network (PSTN) 22 for transmission to an outside party of the call, such as customer A. Each of agents B, C . . . N would wear a similar noise-canceling headset 10 and be connected to PBX 20 and could hold conversations with other customers, as illustrated in FIG. 2.

The solution in accordance with the background art has enjoyed limited success. It is believed that such a secondary microphone and DSP system provides a reduction of the extraneous noise EN on the order of about 6 dB. A 6 dB reduction of the extraneous noise EN is certainly an improvement over the typical headsets, without noise cancellation capability.

However, the Applicant has appreciated several drawbacks to the solution in accordance with the background art. First, a 6 dB reduction in noise is not dramatic or particularly significant. While it is an improvement, the customer may still overhear other conversations in the call center, and be distracted and annoyed by other background noises, which can still be quite loud, even after a 6 dB reduction.

Second, the DSP 16 will introduce a level of distortion into the modified voice signal transmitted by the DSP 16 to the customer. The distortion is primary the result of the close proximity of the secondary microphone 14 to the wearer of the headset 10. In other words, even through the secondary microphone 14 is directed away from the mouth of the wearer of the headset 10, the voice of the wearer will, to some extent, enter into the secondary microphone 14. After all, the voice of the wearer is usually the most intense sound source in the proximity of the secondary microphone 14, and the directional quality of the secondary microphone 14 is not perfect.

Therefore, the DSP 16 will receive a certain level of the voice of the wearer through the secondary microphone 14 and may have difficulty in accurately distinguishing the extraneous noise EN from the wearer's voice signal. As a result, the DSP 16 will modify the voice signal coming from the primary microphone 12 by removing the noise signal (which includes the extraneous noise EN and the voice signal), which will degrade the quality of the agent's voice, as perceived by the customer A.

Another drawback is that the DSP 16 of the headset 10 must be miniaturized to be conveniently located within the framework of the headset 10. Therefore, the DSP 16 is typically of a custom design and has less processing power than a full-size processor, as used in common computers. Also, it is difficult, and typically prohibitively expensive, to upgrade the software of the DSP 16 or to replace the DSP 16 with an upgraded processor, as the technology improves over time.

Another drawback is that a power source 17 is required by the DSP 16. The power source 17 is typically a battery and must be recharged and periodically replaced. Also, the power source 17, DSP 16, and secondary microphone 14 add to the weight of the headset 10, which adds to the discomfort of the wearer.

Another drawback is the cost and complexity of the headset 10. Each headset 10 must include one or more secondary microphones 14. Also each headset 10 must include the DSP 16 and the power source 17. Therefore, the cost of the headset 10 is much higher than the cost of a simple headset without noise-cancellation circuitry, and the repair cost is likewise much higher. It is certainly feasible that the costs of high-quality noise-canceling headsets 10 would be several hundreds of dollars each. Therefore, for a call center (telemarketing, stock broker facility, 911-center etc.) employing perhaps one hundred agents, the expense and maintenance of such noise-canceling headsets could be very expensive, in the hundred thousand dollar range.

SUMMARY OF THE INVENTION

It is an object of the present invention to address one or more of the drawbacks associated with the background art.

It is an object of the present invention to improve the cancellation of background noise, as perceived by a person speaking to another person, employing a system and method in accordance with the present invention.

It is an object of the present invention to improve the integrity and quality of the transmitted voice signal, even through noise cancellation algorithms are being employed to reduce background noise.

It is an object of the present invention to reduce the weight, complexity, and cost of the headsets employed in a call-center, while improving the overall noise-cancellation ability of the headsets, as compared to the background art.

It is an object of the present invention to provide a noise-canceling headset wherein the processor used for signal processing can be easily and inexpensively upgraded by software updates and processor exchange, as technology improves in the future.

These and other objects are accomplished by a system and method of operating a call-center having agents using headsets, which are connected to a private business exchange (PBX). Noise cancellation for the several headsets occurs in a noise filter within the PBX, or in a noise filter within a separate device connected to the PBX. Noise cancellation for a particular agent's conversation is achieved by receiving the voice signals from neighboring agents' headsets and by using adaptive noise cancellation in the noise filter to cleanly remove the other agents' conversations from the particular agent's conversation. Microphones may also be placed at other noise sources, such as photocopiers and HVAC equipment, so that offending noises are accurately received at the noise filter and removed from the agents' conversations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

Figure 1:
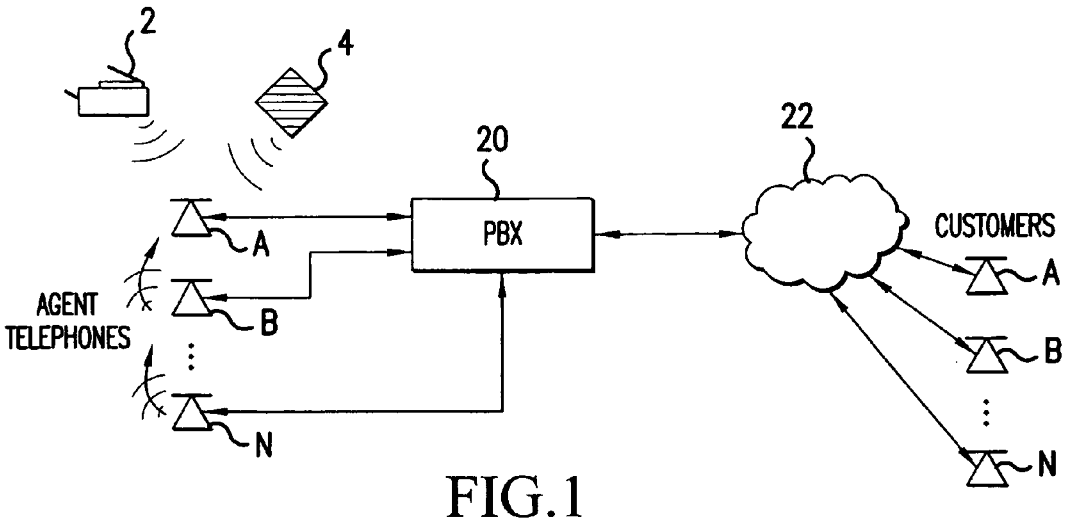
FIG.1 BACKGROUND ART
FIG. 1 illustrates a call center with many agents in close proximity and additional equipment noise sources, in accordance with the background art.
Figure 3:
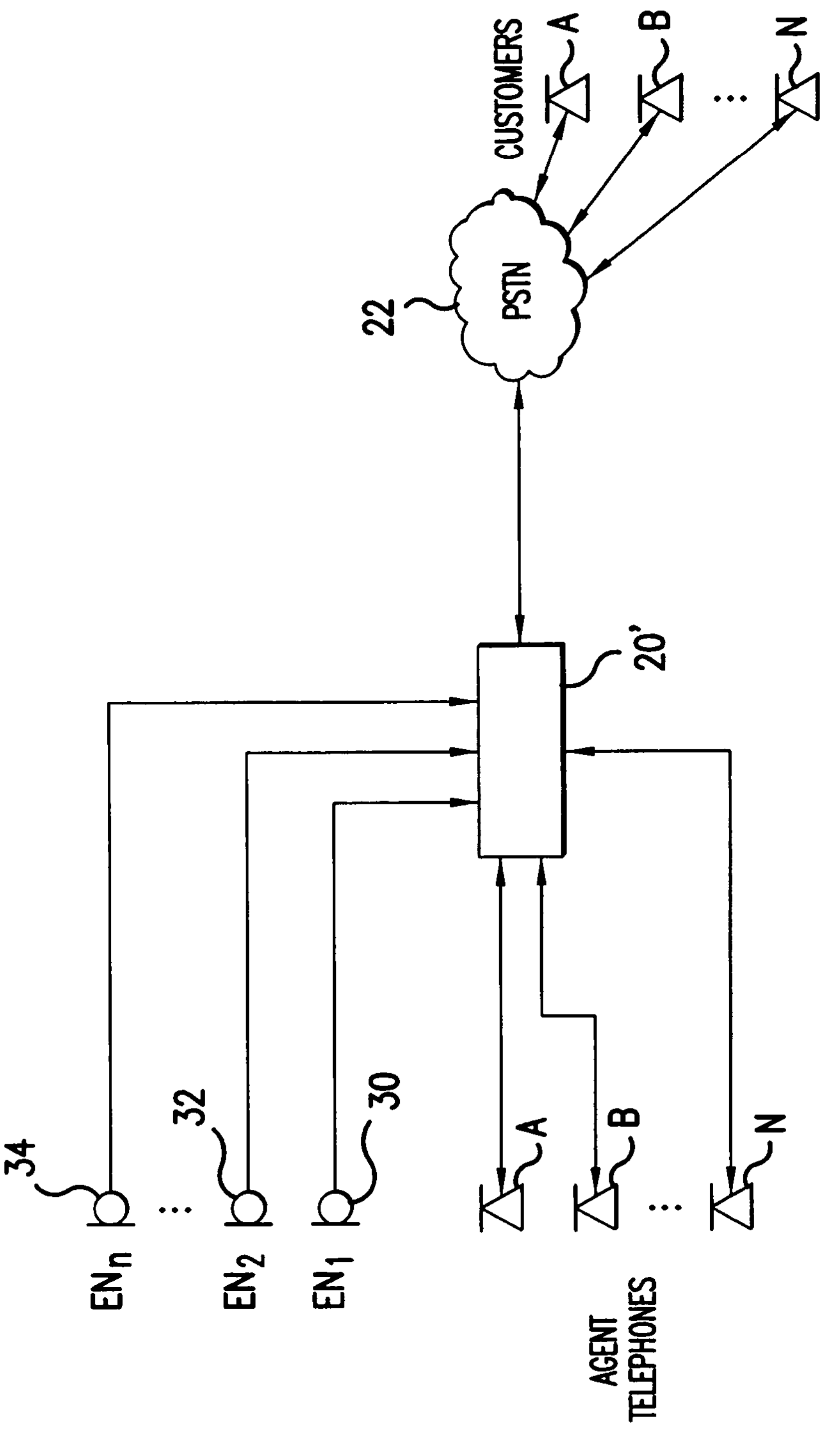
FIG. 3 illustrates a call center having a noise cancellation feature incorporated in a modified PBX, in accordance with the present invention.

FIG. 3 shows a call center noise cancellation system, in accordance with the present invention. Now, the differences between the system in accordance with the present invention and the system as described in connection with the background art of FIG. 1 will be discussed.

A primary difference is that the PBX 20 of the background art has been replaced with a module connected to a conventional PBX 20, or a module including a convention PBX 20. Either situation shall be referred to as a modified PBX 20'. The modified PBX 20' has internal circuitry and/or software performing noise cancellation, as will be more fully discussed in connection with FIG. 4. Also, a plurality of additional microphones 30, 32, 34 has been connected to the modified PBX 20'. The additional microphones 30, 32, 34 are placed immediately adjacent to noise sources in the call center, other than agents wearing headsets A, B . . . N. Such other noise sources could be HVAC equipment, a doorway to a noisy hall, a customer service desk which deals with walk-in customers, etc.

Figure 4:
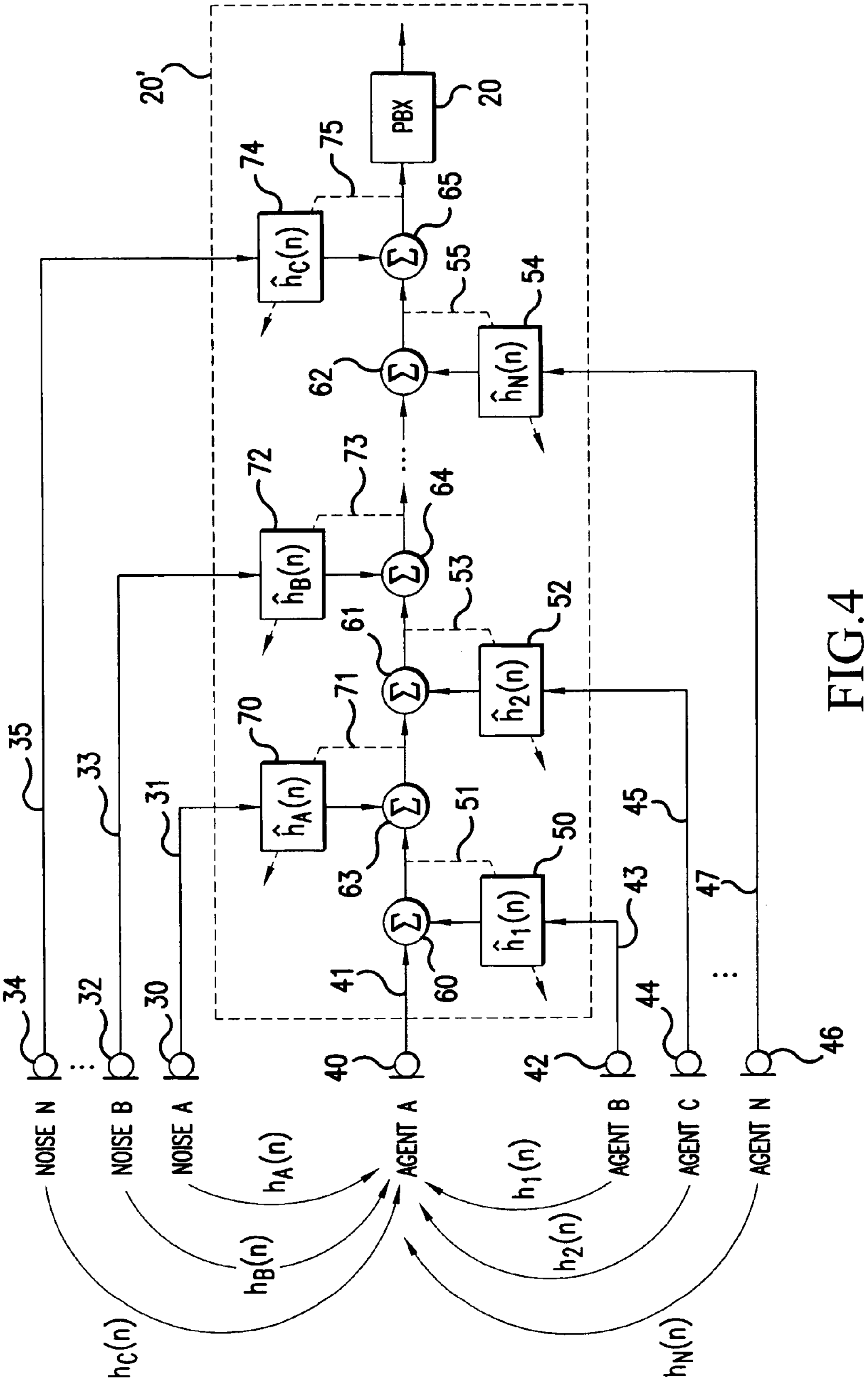
FIG. 4 illustrates the internal circuitry of the modified PBX to show the adaptive noise cancellation features of the present invention.

As illustrated in FIG. 4, a signal 41 from the microphone 40 of agent A enters into the modified PBX 20'. Inside the modified PBX 20', the signal 41 passes through several stages of adaptive noise cancellation. For example, a signal 43 from agent B's microphone 42 passes through a first adaptive noise filter 50. The first adaptive noise filter 50 processes signal 43 from agent B's microphone 42 and provides its output to a first signal combiner 60, which adds the modified signal to the signal 41 of agent A's microphone 40. A feedback loop 51, downstream of the first signal combiner 60, is used by an adaptive filtering algorithm to update the coefficients of the first adaptive noise filter 50 such that the output of the first adaptive noise filter 50 best models Agent B's voice as detected by Agent A's microphone 40. Such an adaptive noise filter is known in the art. See Widrow and S. D. Stearns, *Adaptive Signal Processing*, Prentice-Hall, 1985, which is incorporated herein by reference.

A signal 45 from agent C's microphone 44 passes through a second adaptive noise filter 52. The second adaptive noise filter 52 processes signal 45 from agent C's microphone 44 and provides its output to a second signal combiner 61, which adds the modified signal to the signal 41 of agent A's microphone 40. A feedback loop 53, downstream of the second signal combiner 61, is used by an adaptive filtering algorithm to update the coefficients of the second adaptive noise filter 52 such that the output of the second adaptive noise filter 52 best models Agent C's voice as detected by Agent A's microphone 40.

A signal 47 from agent N's microphone 46 passes through a third adaptive noise filter 54. The third adaptive noise filter 54 processes signal 47 from agent N's microphone 46 and provides its output to a third signal combiner 62, which adds the modified signal to the signal 41 of agent A's microphone 40. A feedback loop 55, downstream of the third signal combiner 62, is used by an adaptive filtering algorithm to update the coefficients of the third adaptive noise filter 54 such that the output of the third adaptive noise filter 54 best models Agent N's voice as detected by Agent A's microphone 40.

The modified PBX 20' may also include circuitry to compensate for other types of background noises besides conversations of agents B, C, N. For example, microphones 30, 32, 34 may be placed immediately adjacent to other noise sources in the call center, such as HVAC equipment, a doorway to a noisy hall, a customer service desk which deals with walk-in customers, etc.

A signal 31 from noise A's microphone 30 passes through a fourth adaptive noise filter 70. The fourth adaptive noise filter 70 processes signal 31 from noise A's microphone 30 and provides its output to a fourth signal combiner 63, which adds the modified signal to the signal 41 of agent A's microphone 40. A feedback loop 71, downstream of the fourth signal combiner 63, controls the adaptation of the fourth adaptive noise filter 70.

A signal 33 from noise B's microphone 32 passes through a fifth adaptive noise filter 72. The fifth adaptive noise filter 72 processes signal 33 from noise B's microphone 32 and provides its output to a fifth signal combiner 64, which adds the modified signal to the signal 41 of agent A's microphone 40. A feedback loop 73, downstream of the fifth signal combiner 64, controls the adaptation of the fifth adaptive noise filter 72.

A signal 35 from noise N's microphone 34 passes through a sixth adaptive noise filter 74. The sixth adaptive noise filter 74 processes signal 35 from noise N's microphone 34 and provides its output to a sixth signal combiner 65, which adds the modified signal to the signal 41 of agent A's microphone 40. A feedback loop 75, downstream of the sixth signal combiner 65, controls the adaptation of the sixth adaptive noise filter 74.

Although FIG. 4 illustrates the noise cancellation circuitry for the signal 41 of agent A's microphone 40, it should be appreciated that the modified PBX 20' includes similar circuitry or software for the microphone signals 43, 45 and 47 of agents B, C . . . N. In other words, the signal 43 from the microphone 42 of agent B would likewise be processed through several signal combiners to add noise compensating signals based on the signals 41, 45 and 47 of agents A, C and N, and to add compensating signals based on signals 31, 33 and 35 of noise sources A, B and N.

Figure 2:
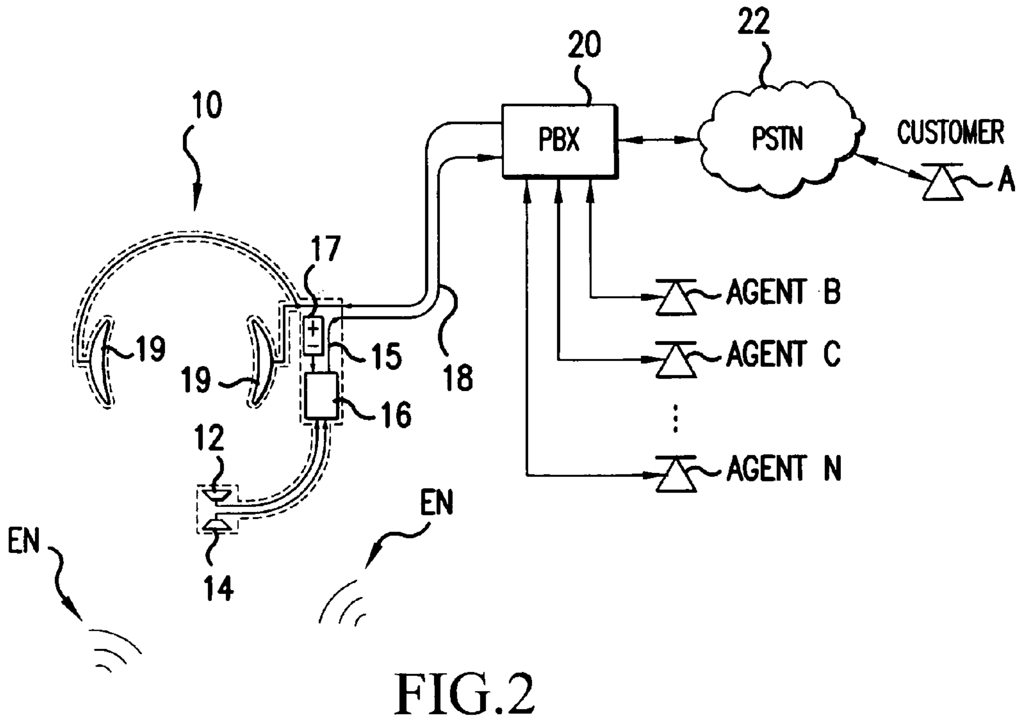
FIG.2 BACKGROUND ART
FIG. 2 illustrates a noise-canceling headset in a call center, in accordance with the background art.

The system of the present invention offers numerous advantages over the noise-canceling headsets of the background art, as discussed in combination with FIG. 2. First, each headset no longer requires the noise-canceling equipment, such as the DSP 16, the power source 17 and the secondary microphone 14. This greatly reduces the costs of the headsets and the weight of the headsets. Now, the agents A, B, C . . . N can use standard headsets, which are more comfortable.

The system of the present invention can more accurately reduce background noise, as compared to the background art. The system of the present invention receives extremely accurate signals representing the unwanted noise. It accomplishes this by having the microphones, sensing the background noise for a particular agent, positioned immediately at the sources of the background noise. For example, in the headset of a neighboring agent and facing to the neighboring agent's mouth, or attached to a ceiling panel beside of a rattling HVAC vent. Therefore, the signal representation of the unwanted noise is very clear and accurate.

Also, the signal representation of the unwanted noise will have very little, or no, signal component of the particular agent's voice included therein. In other words, the background noise is no longer picked up by a microphone (e.g. secondary microphone 14 of FIG. 2) attached to the particular agent's headset, where it would also pickup the agent's voice in combination with the background noise. Now, the noise-sensing microphones are greatly distanced from the particular agent's headset, and will receive not much, if any, of the particular agent's telephone conversation. Therefore, the particular agent's telephone conversation will not be treated as background noise, or will be so treated to a much lesser extent, in the noise compensation circuitry of the present invention. This results in less distortion to the particular agent's voice, and an ability to have a greater degree of noise cancellation, e.g. well above a 6 dB reduction in background noise.

Another benefit of the system of the present invention is that the noise reduction for the entire system can be handled by a single processor in the modified PBX 20', instead of many miniaturized DSPs 16 within many headsets 10. This presents not only a cost savings, but the processor of the modified PBX 20' and can a standard, full-sized processor, which is typically a cheaper yet a much more powerful processor. By having the noise reduction achieved within a rather large and accessible modified PBX 20', it is also possible to easily update the noise reduction software and exchange the processor for updated processor versions, as technology progresses over time. This was not easy or practical in the headsets 10 of the background art, as no port was available on the headset to update the software, and exchanging the DSP 16 was cost prohibitive.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

For example, the additional microphones 30, 32, 34 are optional to the present invention. There may be circumstances where background equipment noise is not a problem in the call center. Also, there would still be a vast improvement in the cancellation of background conversations by other agents, even without providing the additional background noise reduction for equipment noise in the call center.

Although FIG. 3 illustrates the modified PBX 20' as being in one box, the modified PBX 20' may occupy more than one physical cabinet. In other words, the noise reduction filtering could occur in a module, which is physically separate from and electrically connected upstream or downstream to a conventional PBX 20.

Although FIG. 4 illustrates circuitry, it should be understood that such a layout is figurative to assist in the explanation and understanding of the functioning of the invention. The functionality of such circuitry could be accomplished in software through signal processing techniques employed in one or more processors. Also, the adaptive noise cancellation need not occur in stages, as illustrated.

Although FIGS. 3 and 4 illustrate wired connections between the microphones and the modified PBX 20', it should be appreciated that such connections could be wireless connections, such as 900 MHz or 2.4 GHz signals or even infra red (IR) signals.

The term "headset" has been used in this specification. This term encompasses all devices handled, activated or worn by a user to assist in the transmission of verbal communications to another person or persons, such as handsets, earbuds or other such common devices which hook over the ear of the user and have a short arm extending toward the user's mouth to support a microphone or have a microphone located on a flexible cable which passes near the user's mouth, as the cable connects to a telephone or transmission device worn on the user's belt or carried in the user's pocket.

What is claimed:

1. A noise reduction system comprising:

a telephone controller configured to connect a plurality of telephones having microphones, including a first, a second and a third telephone, to a public telephone network, the telephone controller including a processor and a plurality of inputs, including first, second and third inputs, for receiving, respectively, a first microphone signal from the first telephone, a second microphone signal from the second telephone and a third microphone signal from the third telephone, wherein the first microphone signal reflects sound received at the first telephone's microphone, wherein said sound received at the first telephone's microphone includes sound from a user of the first telephone, sound from a user of the second telephone, and sound from a user of the third telephone;

a processor connected to said plurality of inputs; and a computer-readable medium encoded with a program to control said processor, wherein the program causes said processor to control a first adaptive noise cancellation process to receive as input, the first and second microphone signals and, based on the first and second microphone signals, remove from the first microphone signal at least a portion of the sound received at the first telephone's microphone from the user of the second telephone, and output a corresponding first filtered first microphone signal; and to control a second adaptive noise cancellation process to receive as input, the first filtered first microphone signal and the third microphone signal and, based on the first filtered first microphone signal and the third microphone signal, remove from the first filtered first microphone signal at least a portion of the sound received at the first telephone's microphone from the user of the third telephone, and output a corresponding second filtered first microphone signal, wherein the first adaptive noise cancellation process includes generating a modified second microphone signal modeling the sound of the user of the second telephone as received at the microphone of the first telephone, and combining the modified second microphone signal with the first microphone signal to generate the first filtered first microphone signal, and wherein the second adaptive noise cancellation process includes generating a modified third microphone signal modeling the sound of the user of the third telephone as received at the microphone of the first telephone, and combining the modified third microphone signal with the first filtered first microphone signal to generate the second filtered first microphone signal.

2. The system according to claim 1, wherein the telephone controller further includes a fourth input for receiving a fourth microphone signal output from a fourth microphone for receiving a noise sound, and wherein the program also causes said processor to control a third adaptive noise cancellation process to receive as input, the fourth microphone signal and, based on the first microphone signal and the fourth microphone signal, remove from the second filtered first microphone signal at least a portion of the noise sound received at the first telephone's microphone, and output a corresponding third filtered first microphone signal.

3. The system according to claim 1, wherein said plurality of inputs are adapted to receive wired connections from the plurality of microphones.

4. The system according to claim 1, wherein said plurality of inputs are adapted to receive wireless signals from the plurality of microphones.

5. The system according to claim 1, wherein said processor is contained within a private business exchange (PBX) unit of a telephone system.

6. The system according to claim 1, wherein said processor is contained within a module for connection to a private business exchange (PBX) unit of a telephone system.

7. A method for removing from a microphone signal from one person's microphone portions corresponding to other persons' voice sounds received by the microphone based upon microphone signals of the microphones of the other persons, said method comprising:

receiving at a first microphone among the microphones a voice sound that includes a voice sound from a first person using the first microphone, and a voice sound from a second person using a second microphone among the microphones, and a voice sound from a third person using a third microphone among the microphones and, in response, generating a first microphone signal;

receiving at the second microphone the voice sound from the second person and, in response, generating a second microphone signal;

receiving at the third microphone the voice sound from the third person and, in response, generating a third microphone signal;

filtering the first microphone signal by at least partially removing portions of the first microphone signal which correspond to the second microphone signal and outputting a corresponding first filtered first microphone signal; and filtering the first filtered first microphone signal by at least partially removing portions of the first filtered first microphone signal which correspond to the third microphone signal and outputting a corresponding second filtered first microphone signal, wherein filtering the first microphone signal includes generating a modified second microphone signal modeling the sound of the user of the second microphone as received at the first microphone, and combining the modified second microphone signal with the first microphone signal to generate the first filtered first microphone signal, and wherein filtering the first filtered first microphone signal includes generating a modified third microphone signal modeling the sound of the user of the third microphone as received at the first microphone, and combining the modified third microphone signal with the first filtered first microphone signal to generate the second filtered first microphone signal.

8. The noise reduction system of claim 1, wherein the program causes said processor to control the generating the modified second microphone signal by passing the second microphone signal through a first adaptive noise filter process having first coefficients and generating, as an output, the modified second microphone signal, and wherein the program also causes said processor:

to control feeding back the filtered first microphone signal and, based on said feeding back, updating the first coefficients; and to control continuing said passing the second microphone signal through the first adaptive noise filter process, combining the modified second microphone signal with the first microphone signal, feeding back the first filtered first microphone signal to the first adaptive noise filter process and updating the first coefficients, wherein the program causes said processor to control updating the first coefficients, in said continuing, such that the modified second microphone signal best models the voice of the user of the second telephone as detected by the microphone of the first telephone.

9. The noise reduction system of claim 8, wherein the program causes said processor to control the generating the modified third microphone signal by passing the third microphone signal through a second adaptive noise filter process having second coefficients and generating, as an output, the modified third microphone signal, and wherein the program also causes said processor:

to control feeding back the second filtered first microphone signal and, based on said feeding back, updating the second coefficients; and to control continuing said passing the third microphone signal through the second adaptive noise filter process, combining the modified third microphone signal with the first filtered first microphone signal, feeding back the second filtered first microphone signal to the second adaptive noise filter process and updating the second coefficients, wherein the program causes said processor to control updating the second coefficients, in said continuing, such that the modified third microphone signal best models the voice of the user of the third telephone as detected by the microphone of the first telephone.

10. The method of claim 7, wherein generating the modified second microphone signal includes passing the second microphone signal through a first adaptive noise filter process having first coefficients and generating, as an output, the modified second microphone signal, and wherein the method further comprises:

feeding back the filtered first microphone signal and, based on said feeding back, updating the first coefficients; and continuing said passing the second microphone signal through the first adaptive noise filter process, combining the modified second microphone signal with the first microphone signal, feeding back the first filtered first microphone signal to the first adaptive noise filter process and updating the first coefficients, wherein updating the first coefficients, in said continuing, is configured such that the modified second microphone signal best models the voice of the user of the second microphone as detected by the first microphone.

11. The method claim 10, wherein generating the modified third microphone signal includes passing the third microphone signal through a second adaptive noise filter process having second coefficients and generating, as an output, the modified third microphone signal, and wherein the method further comprises:

feeding back the second filtered first microphone signal and, based on said feeding back, updating the second coefficients; and continuing said passing the third microphone signal through the second adaptive noise filter process, combining the modified third microphone signal with the first filtered first microphone signal, feeding back the second filtered first microphone signal to the second adaptive noise filter process and updating the second coefficients, wherein updating the second coefficients, in said continuing, is configured such that the modified third microphone signal best models the voice of the user of the third microphone as detected by the first microphone.

12. A noise reduction system comprising:

a plurality of inputs to receive signals from a plurality of microphones, including a first microphone signal from a first microphone, a second microphone signal from a second microphone, and a third microphone signal from a third microphone, wherein the first microphone signal reflects sound received at the first microphone that includes sound from a first person using the first microphone, from a second person using the second microphone and from a third person using the third microphone;

a processor connected to said plurality of inputs; and a computer-readable medium encoded with a program to control said processor, wherein the program causes said processor to control a first adaptive noise cancellation process to receive as input, the first and second microphone signals and, based on the first and second microphone signals, remove from the first microphone signal at least a portion of the sound received at the first microphone from the second person using the second microphone, and output a corresponding first filtered first microphone signal; and to control a second adaptive noise cancellation process to receive as input, the first filtered first microphone signal and the third microphone signal and, based on the first filtered first microphone signal and the third microphone signal, remove from the first filtered first microphone signal at least a portion of the sound received at the first telephone's microphone from the third person using the third microphone, and output a corresponding second filtered first microphone signal, wherein the first adaptive noise cancellation process includes generating a modified second microphone signal modeling the sound of the second person using the second microphone as received at the first microphone, and combining the modified second microphone signal with the first microphone signal to generate the first filtered first microphone signal, and wherein the second adaptive noise cancellation process includes generating a modified third microphone signal modeling the sound of the third person using the third microphone as received at the first microphone, and combining the modified third microphone signal with the first filtered first microphone signal to generate the second filtered first microphone signal.

13. The system of claim 12, wherein the program causes said processor to control the generating the modified second microphone signal by passing the second microphone signal through a first adaptive noise filter process having first coefficients and generating, as an output, the modified second microphone signal, and wherein the program also causes said processor to control:

feeding back the filtered first microphone signal and, based on said feeding back, updating the first coefficients; and continuing said passing the second microphone signal through the first adaptive noise filter process, combining the modified second microphone signal with the first microphone signal, feeding back the first filtered first microphone signal to the first adaptive noise filter process and updating the first coefficients, wherein the program causes said processor to control updating the first coefficients, in said continuing, such that the modified second microphone signal best models the voice of the second person using the second microphone as received by the first microphone.

14. The system of claim 13, wherein the program causes said processor to control the generating the modified third microphone signal by passing the third microphone signal through a second adaptive noise filter process having second coefficients and generating, as an output, the modified third microphone signal, and wherein the program also causes said processor to control:

feeding back the second filtered first microphone signal and, based on said feeding back, updating the second coefficients; and continuing said passing the third microphone signal through the second adaptive noise filter process, combining the modified third microphone signal with the first filtered first microphone signal, feeding back the second filtered first microphone signal to the second adaptive noise filter process and updating the second coefficients, wherein the program causes said processor to control updating the second coefficients, in said continuing, such that the modified third microphone signal best models the voice of the third person using the third microphone as received by the first microphone.

* * * * *